(12) United States Patent
Lynch

(10) Patent No.: US 8,963,011 B2
(45) Date of Patent: Feb. 24, 2015

(54) INSULATING COVER AND RETAINING PIN FOR HIGH VOLTAGE ELECTRICAL TRANSMISSION STRUCTURES

(75) Inventor: Michael Lynch, Reno, NV (US)

(73) Assignee: Eco Electrical Systems, Reno, NV (US)

( * ) Notice: Subject to any disclaimer, the term of this patent is extended or adjusted under 35 U.S.C. 154(b) by 580 days.

(21) Appl. No.: 13/440,906

(22) Filed: Apr. 5, 2012

(65) Prior Publication Data

US 2013/0264097 A1   Oct. 10, 2013

(51) Int. Cl.
*H01B 17/00* (2006.01)
*H02G 7/05* (2006.01)

(52) U.S. Cl.
CPC ..................... *H02G 7/05* (2013.01)
USPC ............... 174/168; 174/169; 174/170

(58) Field of Classification Search
CPC ....................................... H02G 7/05
USPC ........................ 174/168, 169, 170
See application file for complete search history.

(56) References Cited

U.S. PATENT DOCUMENTS

| | | | | |
|---|---|---|---|---|
| 5,515,656 A | * | 5/1996 | Mihalich | 52/155 |
| 7,154,036 B2 | * | 12/2006 | Lynch | 174/5 R |
| 2006/0003622 A1 | * | 1/2006 | Lynch | 439/404 |
| 2010/0218988 A1 | * | 9/2010 | Lynch | 174/5 R |

* cited by examiner

*Primary Examiner* — Timothy Thompson
*Assistant Examiner* — Rhadames J Alonzo Miller
(74) *Attorney, Agent, or Firm* — Patent Law Group LLP; Brian D. Ogonowsky

(57) ABSTRACT

A plastic retaining pin for being inserted through a retaining hole in a high voltage insulating cover has an oval cross-section. The pin has a compressible nose, with the wide part of the nose being larger than the retaining hole. The nose has a relatively long front portion that expands out from the tip at about a 15 degree angle for easy insertion through the retaining hole. A back part of the nose is relatively short and has a relatively steep angle of about 45 degrees so as to require a higher pulling force to compress the nose when removing the pin from the hole. The other end of the pin has a grasping hole for receiving the hook of a hot stick. If the retaining hole is oval, the grasping hole is at a predetermined orientation with respect to the insulating structure to ease removal using a hot stick.

21 Claims, 5 Drawing Sheets

INSULATING COVER AND RETAINING PIN FOR HIGH VOLTAGE ELECTRICAL TRANSMISSION STRUCTURES

FIELD OF THE INVENTION

This invention relates to an insulating cover and retaining pins for use on high voltage electrical transmission structures and, in particular, to pin features that improve the pin's reliability and ease of use by a lineman using a hot stick hook.

BACKGROUND

A hot stick is an insulated pole, typically made of fiberglass, used by electric utility workers (linemen) when working on energized high-voltage electric power lines to protect them from electric shock. Depending on the tool attached to the end of the hot stick, it is possible to test for voltage, tighten nuts and bolts, apply tie wires to insulators, open and close switches, replace fuses, lay insulating covers on wires, and perform various other tasks while not exposing the crew to a large risk of electric shock. The hot stick may be up to 30 feet long. In the United States, ASTM Standard F 711 specifies the stringent requirements for hot sticks.

One of the tools attachable to the end of a hot stick is a hook that is inserted into a hole of a structure to grab the structure. It would be convenient for the hole to always be oriented vertical to the ground so that the lineman can easily insert the hook into the hole. For fuse holders and other fixed structures having a grasping hole, the hole is typically vertical to the ground. However, some insulating structures developed and sold by the present inventor use one or more removable pins, having grasping holes, for retaining the insulating structure in place. The pins (and grasping holes) are arbitrarily rotatable, making it more difficult for the lineman to insert the hot stick hook into the hole for removal of the pins.

Additionally, it is important that the pins remain securely inserted through the insulating structure for retaining it, even during the fiercest storm. Therefore, the prior art retaining pins are designed with a resilient expansion nose portion, where the nose portion partially collapses when being pushed through a hole in the insulating structure and expands after it is completely pushed through. The pin's insertion and removable force is the same. It would be desirable, however, for the pin to be inserted at a lower force for ease of insertion using the hot stick, yet require more force for removal to improve reliability. It is easier to pull with a hot stick than to push.

FIGS. 1-3 describe an insulating structure disclosed in the present inventor's published US Application 2010/0218988 that uses pins to secure the insulating structure in place on a tower. US Application 2010/0218988 is incorporated herein by reference.

Prior art FIG. 1 illustrates the top portion of a steel tower 10 supporting wires 12 carrying high voltages, such as greater than 10 kV. Other structures include those formed of cement or wood. The voltage is typically 3-phase, and at least three wires are supported. The tower 10 is grounded by being imbedded in the ground.

Ceramic insulators 14 support the wires 12, where the minimum distance between any wire 12 and the tower 10, or between any two wires, is determined by the IEEE National Electric Safety Code.

Insulating guards 20 are affixed over the grounded struts 16/18 of the tower 10 to prevent flashover due to a large bird getting between a strut 16/18 and an overhead wire 12. The guard 20 prevents flashover, since any flashover must travel around the outer surface of the guard 20 to the grounded structure. This is because the dielectric strength of the guard 20 material is many times that of air, and the air around the guard 20 will break down before the guard 20 material will break down.

Pins 24 retain the guard 20 in place by blocking the guard 20 from being lifted off the strut 16/18 by the wind.

FIG. 2 is a perspective view of a single guard 20. The guard 20 is formed of a sheet of one-eighth inch thick HDPE (a plastic) that is cut and bent in the shape shown using conventional techniques.

An angled section 22 is about 3 feet long and wide enough (e.g., 3.25 inches) to fit over a strut 16. Its sides may be about 6-8 inches to completely cover the sides of the strut 16 and still allow room below the strut 16 for passing the retaining pins 24 (FIG. 3) through a round hole in the sides to prevent the guard 20 from blowing off in a high wind. The guard 20 also includes a bottom section 26 that resides over the insulator 14 and a wide middle section 28 that deters a large bird from perching on it.

FIG. 3 is a side view of the plastic retaining pin 24 that is easily inserted through round holes on both sides of the guard 20 after the lineman positions the guard 20 over the upper portion of the angled strut 16 while the lineman is supported on the center body of the tower 10 or in a bucket far from the wires 12. The pin 24 may be 4-5 inches long for use with the guard 20. The body of the pin 24 that is passed through the hole has a circular cross-section. The nose 25 of the pin 24 has a circular bump 29 that contacts the wall of the hole and compresses the nose 25 until the pin 24 is pushed completely through the hole. The contact edge of the bump 29 provides a maximum angle of about 30-45 degrees with respect to the edge of the hole. The length of the bump 26 that must be overcome by pushing the pin 24 is only about one-eighth inch long. The insertion and removal force are the same and about three pounds.

A grasping hole 27 on the pin 24 enables the lineman to grasp the pin 24 using a hook at the end of a hot stick. The pin 24 can freely rotate in the round hole in the guard 20, so the grasping hole 27 will typically not be vertical to the ground when the pin 24 may be later removed. This complicates the removal process.

The same pin 24, of various lengths, is used for the same purpose in a variety of other insulating products to retain the products in place over a wire, insulator connector, metal strut, or other conductor.

What is needed is a retaining pin for an insulator for high voltage applications that is easier to insert yet more difficult to remove, and where the pin's grasping hole remains vertical to the ground for ease of removal and insertion by a hot stick.

SUMMARY

In one embodiment, a plastic retaining pin for a high voltage insulating structure has an oval cross-section, and a wide part of the compressible nose of the pin is in the same plane as the wide diameter of the oval. The end of the pin has a round grasping hole for grasping by a hook of a hot stick. The grasping hole is aligned with respect to the oval cross-section of the pin so that it remains substantially vertical with respect the ground for ease of access by the hook on the hot stick.

The nose has a relatively long front portion that expands out from the tip at about a 15 degree angle. The shallow angle and long nose allow the pin to be pushed through the hole in the insulating product using a relatively low pushing force to compress the nose. It is difficult to push a pin using a hot stick that may be ten feet long, and the present invention eases the lineman's job by requiring less force to push the pin into the insulating structure.

A back part of the nose is relatively short and has a relatively steep angle of about 45 degrees, so as to require a higher pulling force to compress the nose when removing the pin from the hole. This ensures that the pin will not be inadvertently pulled out of the hole during high winds. In one embodiment, the insertion force is about 3 pounds, and the removal force is about six pounds. It is much easier to pull on a pin with a long hot stick, so the increased pulling force is not a problem for the lineman.

If the pin is pushed through an oval hole, such as in a deadend connector or the insulating structure, the flattened shape of the nose naturally orients the pin with respect to the oval hole. The oval cross-section of the pin fits through the oval hole so that the pin is prevented from rotating in the hole once inserted. By causing the pin to automatically be orientated with its grasping hole vertical with respect to the ground, the lineman may more easily hook the hole with the hot stick hook.

In one embodiment, the grasping hole orientation is perpendicular to the wide part of the nose and to the wide diameter of the pin's oval cross-section. In another embodiment, the grasping hole orientation is in-line with the wide part of the nose and with the wide diameter of the pin's oval cross-section.

Other embodiments are described.

BRIEF DESCRIPTION OF THE DRAWINGS

Elements in the various figures labeled with the same numeral are the same or similar.

DETAILED DESCRIPTION

The present invention improves on the retaining pin and insulating structures of the prior art. The retaining pins can be used to retain any insulating structure used in high voltage utility applications, such as insulating covers for automatic deadend connectors, flashover preventers, cable covers, insulator connection covers, and any other structure that entails using a hot stick to position and secure the structure.

Figure 1:
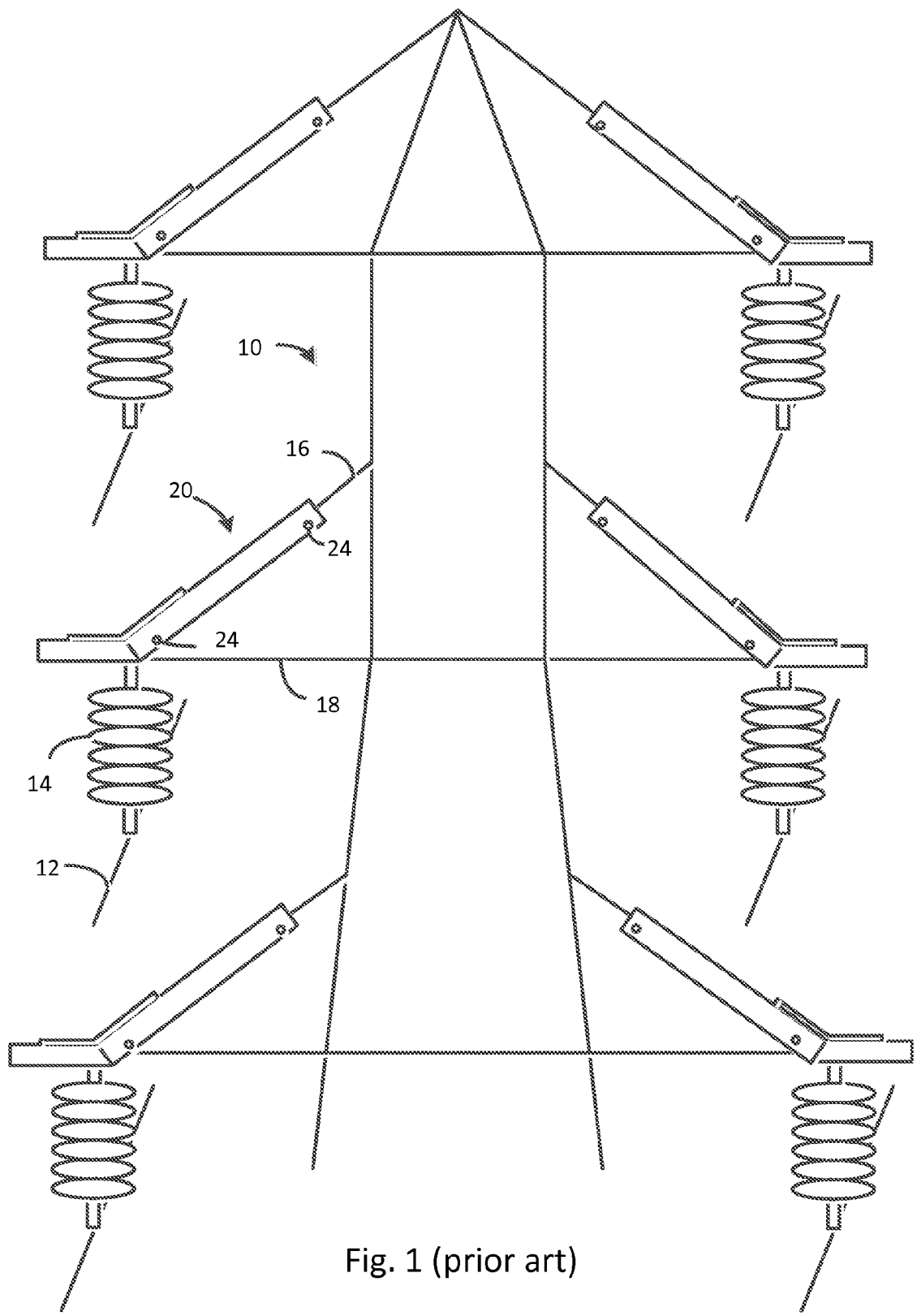
FIG. 1 illustrates a prior art tower and insulating guards being retained on struts of the tower by pins.
Figure 2:
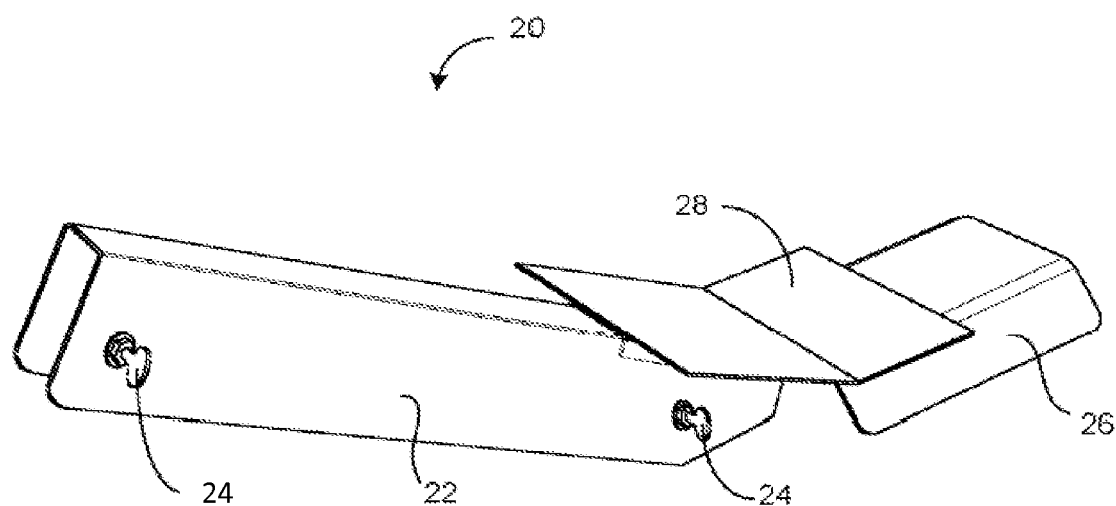
FIG. 2 is a perspective view of the prior art guard of FIG. 1.
Figure 3:
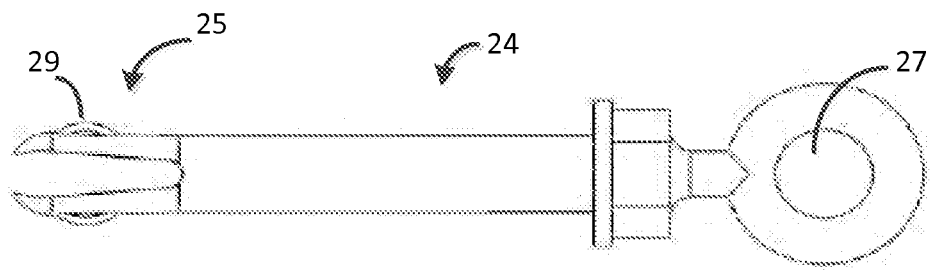
FIG. 3 is a side view of a prior art pin used to retain the guard shown in FIG. 2.
Figure 4:
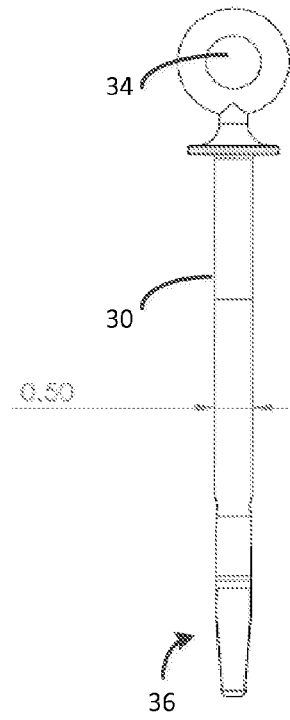
FIG. 4 is a side view of a retaining pin in accordance with the invention.
Figure 5:
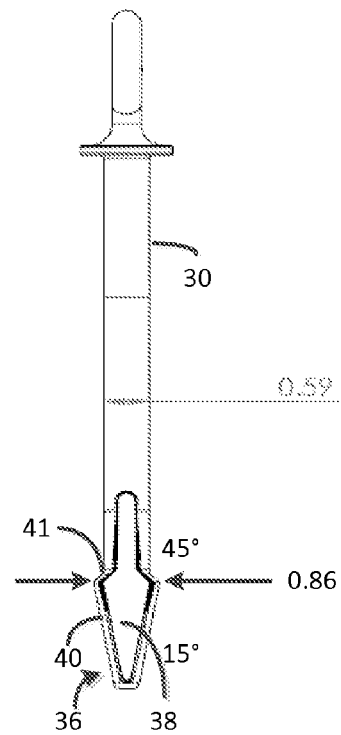
FIG. 5 is a side view of the retaining pin of FIG. 4 rotated 90 degrees.

FIG. 4 is a side view of a retaining pin 30 in accordance with the invention, and FIG. 5 is a side view of the retaining pin 30 rotated 90 degrees. The pin 30 is made of a resilient, molded plastic, such as HDPE. The pin 30 may be any length, depending on the insulating structure to be secured by a hot stick. In one embodiment, the length is between 4-8 inches.

Figure 6:
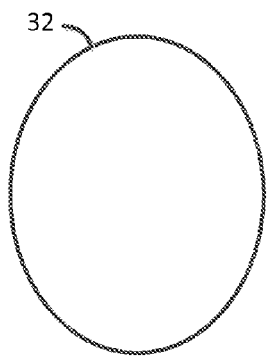
FIG. 6 is a cross-section of the oval-shaped body portion of the pin of FIG. 4.

The body of the pin 30 has an oval cross-section 32, shown in FIG. 6. In one embodiment, the narrow diameter is 0.50 inches and the wide diameter is 0.59 inches. Other thicknesses are also suitable, depending on the application.

At one end of the pin 30 is a grasping hole 34 having a diameter of about 0.75 inches, suitable for receiving a standard size hook on a hot stick.

At the other end of the pin 30 is a resilient nose 36 having an opening 38 that enables the compressed nose 36 to fit through an oval hole in an insulating structure. The oval hole will be slightly greater than 0.50×0.59 inches.

The front 40 of the nose 36 tapers at 15 degrees relative to the centerline and is about 1.5 inches long. The maximum width of the nose 36 is 0.86 inches, requiring force to push the nose 36 through the hole (e.g., about 0.65-0.70 inches) in the insulating structure. Due to the shallow taper and the relatively long nose 36, it is easy to push the pin 30 through the hole in the insulating structure using a hot stick to retain the structure in place. In one embodiment, the maximum insertion force is three pounds.

The back 41 of the nose 36 tapers at about 45 degrees for only about 0.20 inches so provides a relatively abrupt stop to prevent the pin 30 from becoming inadvertently removed from the hole. The removal force is about six pounds.

In another embodiment, the angle of the back 41 of the nose 36 is at least double the angle of the front 40 of the nose 36, and the length of the back 41 is less than half the length of the front 40. This ensures a significant difference between the insertion force and the removal force.

The wide part of the nose 36 is in line with the wide diameter of the oval cross-section of the pin 30. Since the hole in the insulating structure is also oval, the oval shape of the hole automatically orientates the nose 36 so that the oval shape of the pin 30 aligns with the oval shape of the hole.

Figure 7:
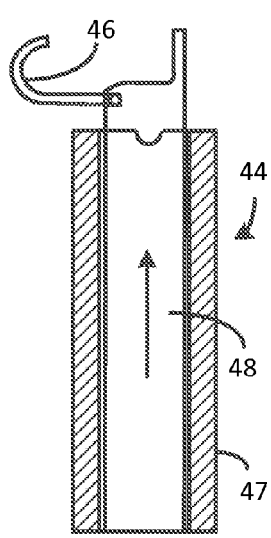
FIG. 7 is a cross-sectional view of the end of a hot stick where a hook is in an extended state for latching onto the grasping hole of the pin.

FIG. 7 is a cross-sectional view of the end of a typical hot stick 44. The hot stick 44 has an external sleeve 47 and an internal rod 48 that can be axially moved. The hot stick 44 has a handle that the lineman can squeeze to extend or withdraw a tool connected to the rod 48. In FIGS. 7 and 8A-8C, the tool is a standardized hook 46. The hook 46 is urged open by a spring when the rod 48 is extended. The lineman inserts the open hook 46 into the grasping hole 34 of the pin 30 for insertion and removal of the pin 30.

Figure 8A:
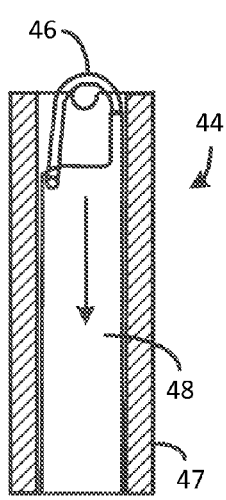
FIG. 8A illustrates the hot stick of FIG. 7 where the hook is in a withdrawn state when securing the pin.
Figure 8B:
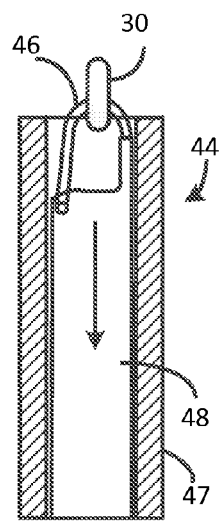
FIG. 8B illustrates the retaining pin secured by the hook when the hook is in a withdrawn state for pushing the pin into the insulating structure or pulling the pin out of the insulating structure.
Figure 8C:
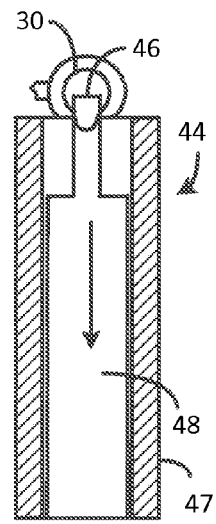
FIG. 8C is a side view of the hot stick of FIG. 8B securing the pin.

In FIGS. 8A-8C, the lineman then squeezes the handle of the hot stick to withdraw the rod 48 to cause the hook 46 to rotate around a pivot while being pulled in to firmly latch onto the pin 30. The lineman then pushes the pin 30 into the oval hole of the insulting structure using the hot stick 44. It is much easier to pull on the hot stick 44 to remove the pin 30 than to carefully manipulate and insert the pin 30 into a hole. Therefore, there is no increased burden on the lineman by increasing the removal force of the pin 30 from the prior art three pound removal force to the six pound removal force of the preferred embodiment.

Figure 9:
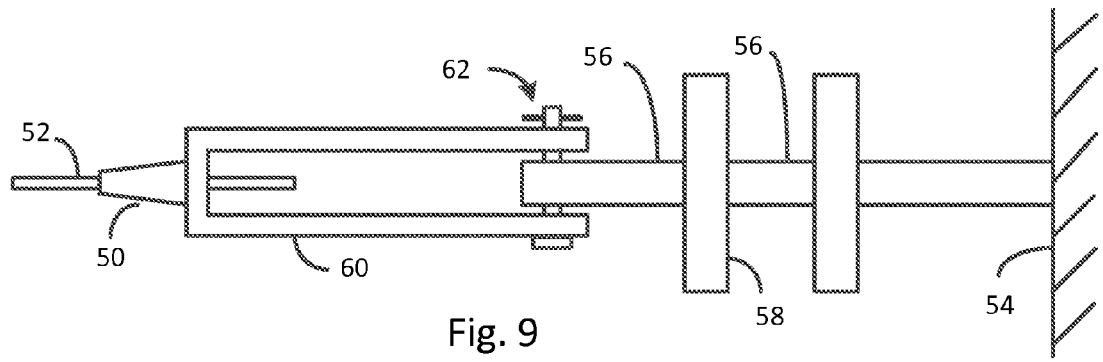
FIG. 9 is a top down view of an automatic deadend connector for a wire, where the connector is coupled to a utility support structure via one or more insulators.

FIG. 9 is a top down view of an automatic deadend connector 50 for a wire 52, where the connector 50 is coupled to a utility support structure 54 via one or more metal connectors 56, one or more insulators 58, and a metal bracket 60 (also known as a bail). The bracket 60 is connected to the metal connector 56 via a clevis pin and cotter pin 62. The connector 50 has inside teeth that grip the wire 52 to prevent it from coming out once it is pushed in. In one embodiment, the bracket 60 and connector 50 have a total length of 15 inches. Such a structure is standard and available from Thomas & Betts Corporation among others.

Figure 10:
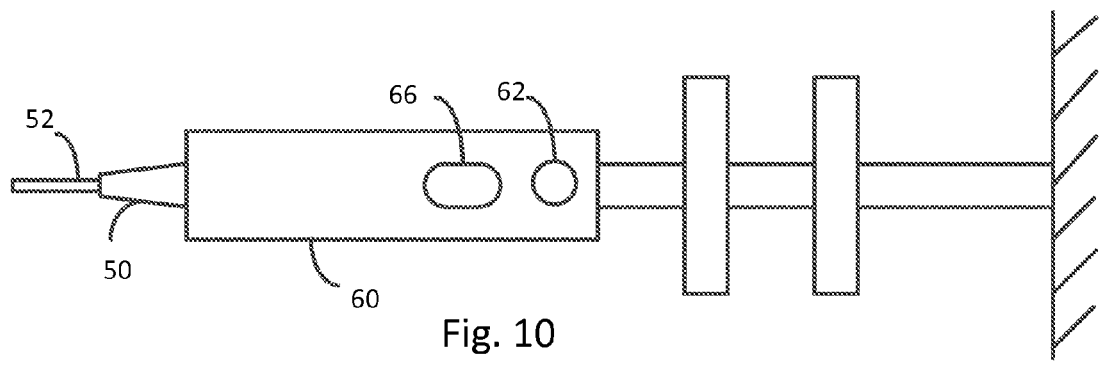
FIG. 10 is a side view of the automatic deadend connector.

FIG. 10 is a side view of the structure of FIG. 9. Oval holes 66 (one on each side of the bracket 60) are conventionally stamped in the bracket 60 for hooking by a motorized apparatus to pull the wire 52 taut once the wire is inserted into the connector 50. Then the bracket 60 is held in place and the lineman inserts the clovis pin and cotter pin 62 to secure it to the utility support structure 54. The oval holes 66 have a size greater than the size of the pins 30.

In one embodiment, the pins 30 may be sized so that the wide diameter of the oval cross-section of the pin 30 is wider than the narrow diameter of the oval holes 66 in the bracket 60 so that, if the pin 30 is inserted through the oval holes 66 while securing the insulating structure, the oval holes 66 orient the pin 30 with respect to the oval holes 66. In this way, the grasping hole 34 of the pin 30 is automatically oriented vertical to the ground to make it much easier for the lineman to grasp the pin 30 with the hot stick hook.

Figure 11:
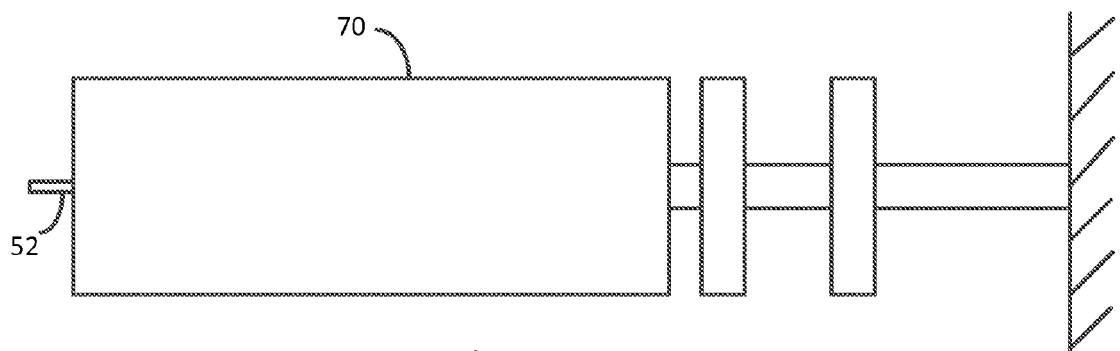
FIG. 11 is a top down view of an insulating cover over the automatic deadend connector.

FIG. 11 is a top down view of an insulating cover 70 over the structure of FIG. 9 to keep the structure clean and less attractive to wildlife. The insulating cover 70 may be an elongated U-shaped piece of plastic. The insulating cover 70 only serves as one example of an insulating structure that can be retained by the pins 30.

Figure 12:
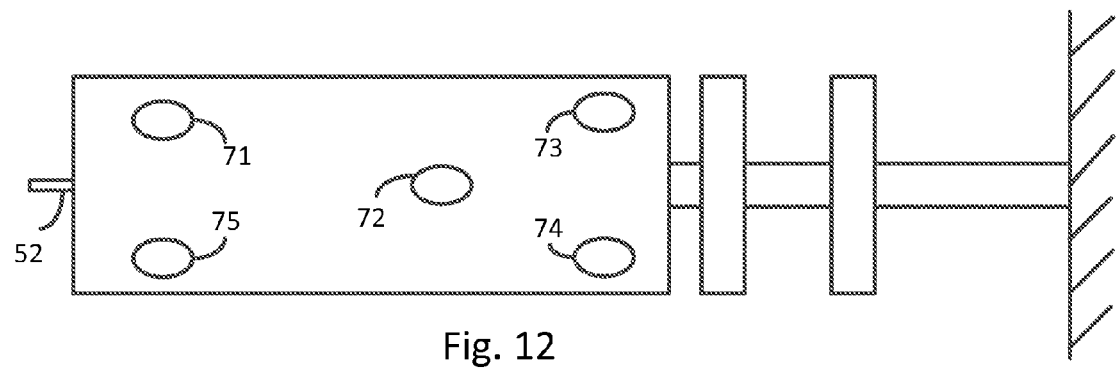
FIG. 12 is a side view of the insulating cover showing oval openings for oval retaining pins.

FIG. 12 is a side view of the insulating cover 70 showing oval openings 71-75 for receiving the oval retaining pins 30. There is an identical set of openings 71-75 on the other side. The opening 72 aligns with the oval opening 66 in the bracket 60 for preventing rotation of the insulating cover 70. All the oval openings 71-75 are slightly larger than the 0.50×0.59 inch cross-section of the pins 30. In one embodiment, the wide diameter of the oval openings is 0.69 inches.

In another embodiment, all openings in the cover 70 are circular and the oval cross-section of the pin 30 is not aligned with the openings. However, the benefits of the different insertion and removal forces remain.

Figure 13:
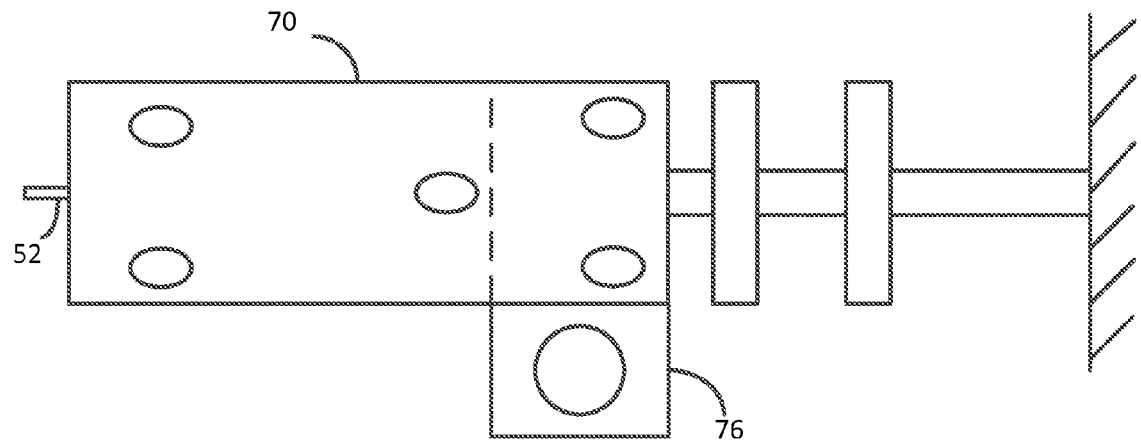
FIG. 13 illustrates the insulating cover of FIG. 12 with an optional key insert to prevent rotation of the insulating cover.

FIG. 13 illustrates the insulating cover 70 of FIG. 12 with an optional key insert 76, also having oval openings, to prevent rotation of the insulating cover 70 in the event that inserting a pin 30 through the hole 66 in the bracket 60 is not appropriate. The key 76 has an extension that extends through the middle of the bracket 60 to prevent rotation.

Figure 14:
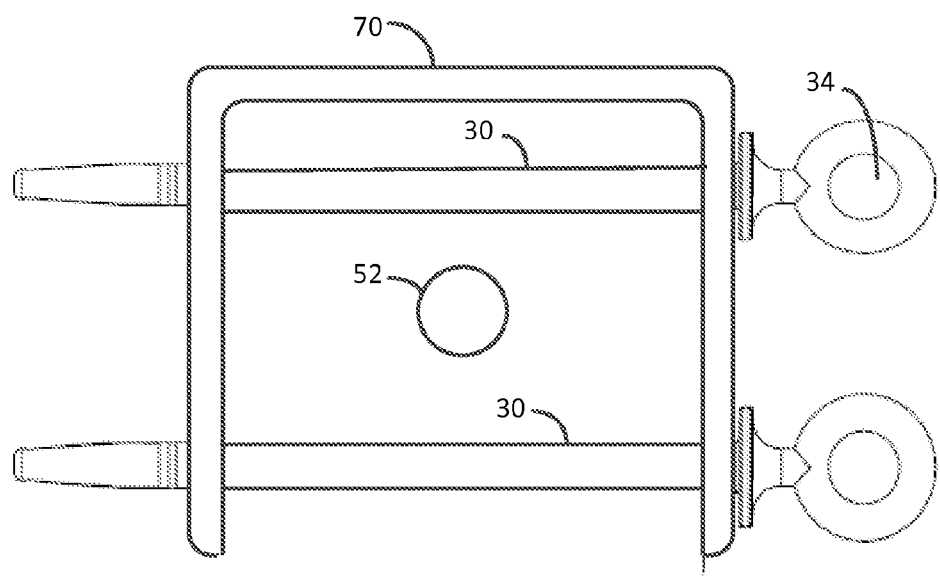
FIG. 14 is an end view of the insulating cover showing the pins of FIG. 4 inserted through the oval holes of the cover to retain the cover in place over the automatic deadend connector.

FIG. 14 is an end view of the insulating cover 70 showing the pins 30 of FIG. 4 inserted through the oval holes 71 and 75 of the cover 70 to block the cover 70 from coming off in high winds and to ensure some separation between the cover 70 and the high voltage metal. Note that the grasping holes 34 of the pins 30 are oriented substantially vertical to the ground for easy access by the hot stick hook.

The angle of the grasping holes 34 is determined by the orientation of the oval holes in the insulating structure or any other oval holes through which the pins 30 are inserted. If the insulating structure is installed on an angle, the grasping holes 34 may not be oriented vertically; however, the orientation is still controlled and all the pins 30 will have the same orientation, making the lineman's job easier.

The pins 30 may be used to retain any product with respect to a high voltage structure where a hot stick is used to insert and remove the pins 30. The insulating structure may insulate a grounded conductor or a conductor at a high voltage.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A system for use in high voltage applications comprising:
    an insulating structure covering a conductor, the insulating structure having a retaining hole; and
    a retaining pin formed of an insulating material, the retaining pin being inserted through the retaining hole to prevent the insulating structure being inadvertently removed from over the conductor,
    the retaining pin having a grasping hole at one end configured for receiving a tool at an end of a hot stick for inserting the pin in the retaining hole and removing the pin from the retaining hole,
    the retaining pin having a nose at its other end, the nose being resiliently collapsible upon a compressive pressure being applied to the nose, a maximum width of the nose being greater than a diameter of the retaining hole, a width of the nose expanding at a first angle away from a tip of the nose for a first length, the width of the nose then decreasing at a second angle for a second length after the first length, the second angle being greater than the first angle and the second length being less than the first length such that an insertion force of the pin needed to insert the pin through the retaining hole is less than a removal force needed to remove the pin from the retaining hole.

2. The system of claim 1 wherein the second angle is at least double the first angle.

3. The system of claim 2 wherein the second length is less than half the first length.

4. The system of claim 1 wherein the pin has an oval cross-section such that the pin, while inserted into the retaining hole, is substantially prevented from turning and is oriented such that the grasping hole is at a predetermined orientation with respect to the insulating structure.

5. The structure of claim 4 wherein the retaining hole is oval.

6. The system of claim 4 wherein the grasping hole of the pin is approximately perpendicular to a wide diameter of the oval cross-section of the pin.

7. The system of claim 4 wherein the predetermined orientation of the grasping hole is substantially perpendicular to the ground.

8. The structure of claim 1 wherein the insulating structure overlies an automatic deadend of a wire.

9. The system of claim 1 wherein the insulating structure at least partially covers a wire conducting a voltage.

10. The system of claim 1 wherein there are a plurality of retaining holes in the insulating structure for receiving a plurality of retaining pins.

11. The system of claim 1 wherein the pin is located below the conductor.

12. A device for retaining an insulating structure over a conductor in high voltage applications, the insulating cover having a retaining hole, the device comprising:
- a retaining pin formed of an insulating material, the retaining pin being configured to be inserted through the retaining hole to prevent the insulating structure being inadvertently removed from over the conductor,
- the retaining pin having a grasping hole at one end configured for receiving a tool at an end of a hot stick for inserting the pin in the retaining hole and removing the pin from the retaining hole,
- the retaining pin having a nose at its other end, the nose being resiliently collapsible upon a compressive pressure being applied to the nose, a maximum width of the nose being greater than a diameter of the retaining hole, a width of the nose expanding at a first angle away from a tip of the nose for a first length, the width of the nose then decreasing at a second angle for a second length after the first length, the second angle being greater than the first angle and the second length being less than the first length such that an insertion force of the pin needed to insert the pin through the retaining hole is less than a removal force needed to remove the pin from the retaining hole.

13. The device of claim 12 wherein the second angle is at least double the first angle.

14. The device of claim 13 wherein the second length is less than half the first length.

15. The device of claim 12 wherein the pin has an oval cross-section such that the pin, while inserted into the retaining hole, is substantially prevented from turning and is oriented such that the grasping hole is at a predetermined orientation with respect to the insulating structure.

16. The device of claim 15 wherein the retaining hole is oval.

17. The device of claim 15 wherein the grasping hole of the pin is approximately perpendicular to a wide diameter of the oval cross-section of the pin.

18. The device of claim 15 wherein the predetermined orientation of the grasping hole is substantially perpendicular to the ground when the pin is inserted into the retaining hole.

19. The device of claim 12 wherein the insulating structure covers a wire conducting a voltage.

20. The device of claim 12 wherein there are a plurality of retaining holes in the insulating structure for receiving a plurality of retaining pins.

21. The device of claim 12 wherein, when the pin is inserted through the retaining hole, the pin is located below the conductor.

* * * * *